United States Patent [19]

Watson

[11] Patent Number: 4,640,660
[45] Date of Patent: Feb. 3, 1987

[54] RECOVERY AND TOWING VEHICLE

[75] Inventor: Norman F. Watson, Chippings, England

[73] Assignee: EKA Group Ltd., London, England

[21] Appl. No.: 701,957

[22] Filed: Feb. 15, 1985

[30] Foreign Application Priority Data

Feb. 20, 1984 [GB] United Kingdom ................. 8404429

[51] Int. Cl.⁴ ............................................. B60P 3/12
[52] U.S. Cl. ..................................... 414/563; 280/402
[58] Field of Search ............... 414/563, 648, 649, 650, 414/680, 743; 248/654; 212/203; 280/402

[56] References Cited

U.S. PATENT DOCUMENTS

| | | | |
|---|---|---|---|
| 1,902,212 | 3/1933 | Bonge | 414/563 |
| 2,067,954 | 1/1937 | Tetrault | 414/563 |
| 2,560,131 | 7/1951 | Sasgen et al. | 414/648 |
| 3,322,396 | 5/1967 | Hubbard | 414/563 X |
| 3,667,630 | 6/1972 | Scott | 414/563 |
| 3,720,330 | 3/1973 | Forse et al. | 280/402 X |
| 4,487,544 | 12/1984 | Hubbard | 414/563 |
| 4,534,579 | 8/1985 | Shackelford, Sr. | 280/402 |
| 4,573,857 | 3/1986 | Porter, Sr. et al. | 414/563 |

FOREIGN PATENT DOCUMENTS

| | | | |
|---|---|---|---|
| 818771 | 10/1951 | Fed. Rep. of Germany | 414/648 |
| 455401 | 10/1936 | United Kingdom | 414/563 |
| 2061193 | 5/1981 | United Kingdom | 414/563 |

Primary Examiner—Joseph E. Valenza
Assistant Examiner—Stuart J. Millman
Attorney, Agent, or Firm—Cumpston & Shaw

[57] ABSTRACT

A recovery and towing vehicle which has been specifically designed for transport in a freighter aircraft and must necessarily therefore be of low profile to fit within the cargo space of an air-transport vehicle comprising a main chassis (1) on which is mounted a cab (3) with a removable upper part (5) and a slewing crane (7) having an extendable boom (11), a winch (10) and spades (23) mounted in slideways (29). The vehicle also is provided with a traditional supported lift towing boom (25) but instead of being mounted for pivoting movement on the chassis (1), the boom (25) is mounted for generally vertical sliding movement. For this purpose, slideways (29) are provided on the inside of housing (31) for the spades and vertical movement of the boom (25) is under the control of the main crane boom (11) which can be connected to the boom (25) by a lift strop (41). By providing for the boom (25) to be movable vertically in slideways rather than being pivotally mounted on the chassis, a low profile chassis can be provided and the vertical dimensions of the vehicle can be kept compact.

The slideways (29) may be straight or arcuate, arcuate slideways having the advantage of providing increased lift. Such increased lift can also be achieved by inserting a spacer wedge (61) between an anvil (55) at the base of the mast (27) and an abutment surface (59) on the folding boom (33).

12 Claims, 4 Drawing Figures

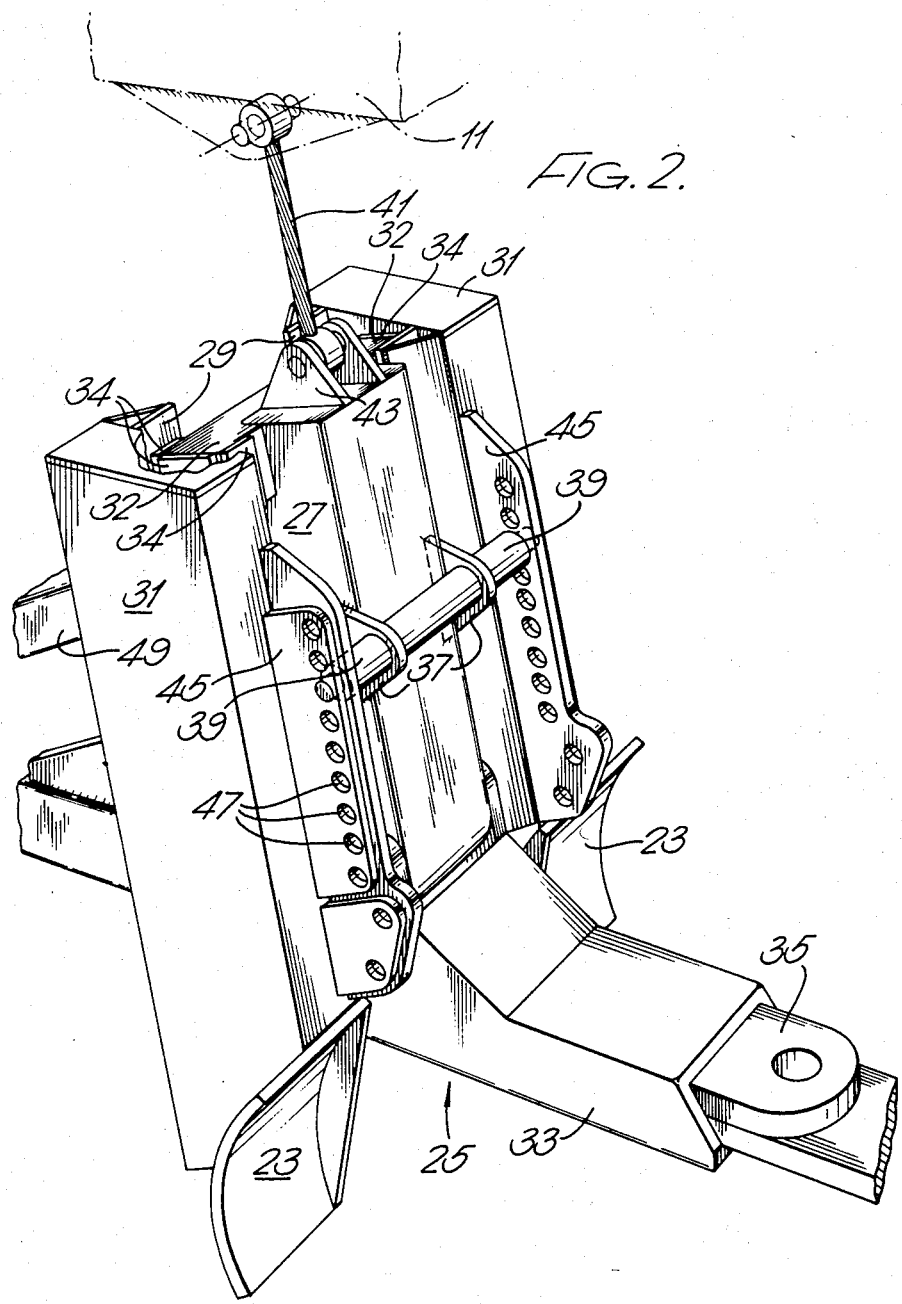

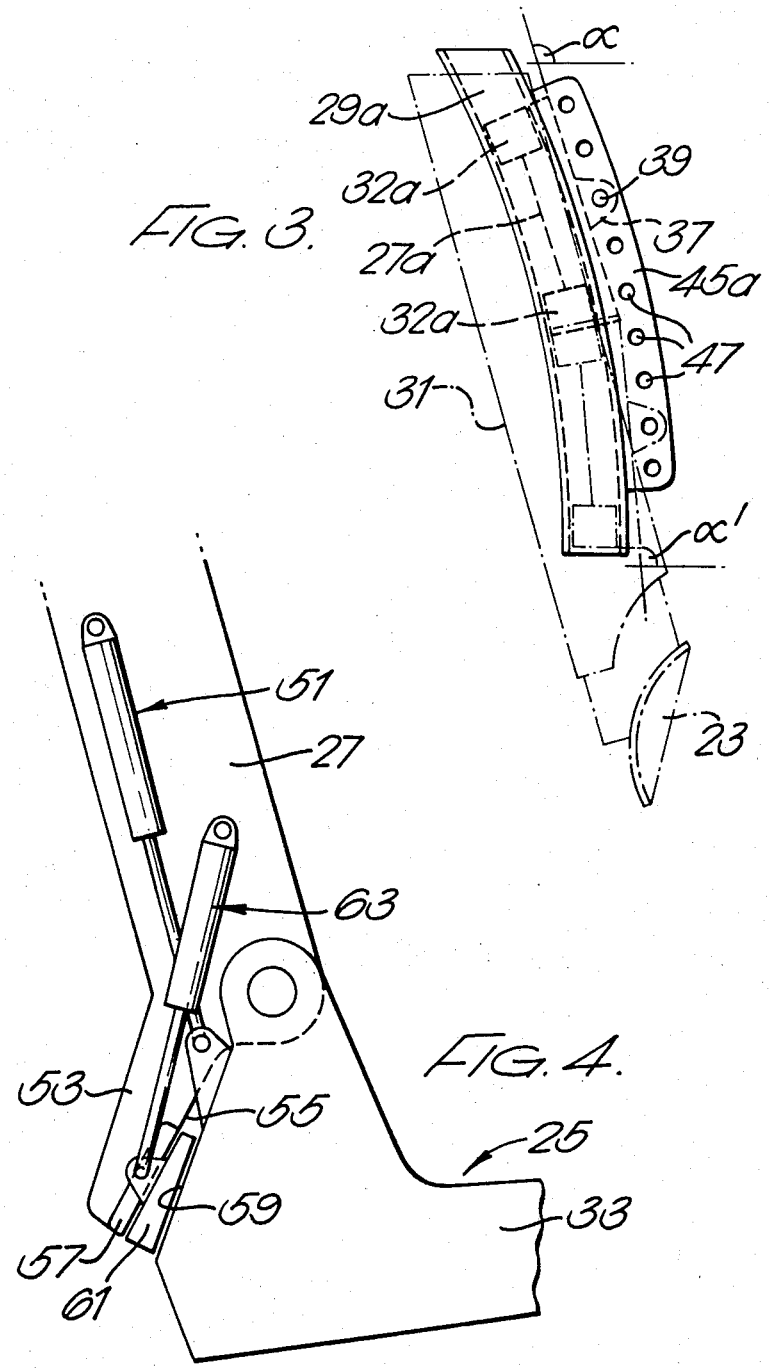

RECOVERY AND TOWING VEHICLE

This invention relates to a recovery and towing vehicle designed particularly, but not exclusively, for military use.

Such recovery vehicles are designed to be capable of recovering heavy vehicles, such as tanks and armoured cars, as well as other heavy vehicles, from ditches and mud and the like, normally using a winch. Additionally, the vehicles should be able to support tow an immobile vehicle, either over open country or on the open road, using a pivoting and lifting or supported lift towing boom which engages under the front or rear of the immobile vehicle, so that its front or rear end can be lifted clear of the ground, and the immobile vehicle can be towed like a trailer. Furthermore, the recovery vehicle should also be provided with a slewing crane, so as to enable relatively light vehicles to be lifted, and so as to enable goods to be off loaded from vehicles, and most importantly, so as to enable vehicle power packs, e.g. a complete tank engine, to be replaced, in the field if necessary.

In U.S. Pat. No. 3,322,396, a towing vehicle is disclosed which has at its rear end a tall mast for supporting a fixed lifting boom, and associated with the mast is an inclined track for a supporting saddle for lifting one end of a disabled vehicle. The saddle can be slid up the track with the aid of a cable, and to engage the disabled vehicle on the saddle it is normally necessary to drag the vehicle onto the saddle, with a winch. There is no disclosure of a pivoting and extendable supported lift towing boom, or of a slewing crane, and the vehicle suffers from the further disadvantage that the mast is almost twice as high as the cab.

A recovery vehicle more like that of this invention is described in Great Britain Pat. No. GB-A-2061193. While this vehicle is most satisfactory and extremely compact, considering its recovery capacity, there is now a demand for an even more compact recovery vehicle, which can be air freighted using existing air transport, to a particular location, so that, on arrival, it is ready for use. The vehicle described in GB-A-2061193 is too tall to fit into air transporters, such as the Hercules aircraft. Unfortunately, it is not possible just to re-design the vehicle disclosed in our said specification with a lower overall height because if one lowers the vehicle chassis, it is not then possible to arrange for the supported lift towing boom to extend beneath the turntable for the slewing crane. A solution for this would be to shorten the supported lift towing boom but in practice this is unacceptable because it would result in the inclination of this boom being too great when the boom is at its maximum height. The boom of course has a generally L-shaped folding boom with an extending boom on the horizontal arm of the L and this extending boom will normally be parallel to the main boom of the supported lift towing boom.

According to the present invention, I provide a recovery vehicle provided with a winch, a slewing crane and a supported lift towing boom for towing another vehicle, wherein the supported lift towing boom is slidably supported on the vehicle for generally vertical movement.

Preferably, the supported lift towing boom has a mast which is slidably supported between and within two parallel slideways, which are preferably straight but may be arcuate.

Preferably, the vehicle is provided with a pair of extendable stiff leg spades at its rear end, which can be extended hydraulically from housings and the slideways are mounted on the inwardly facing walls of the housings.

Preferably, suitable stays extend forwardly from adjacent the top of the housings for the stiff leg spades and the main vehicle chassis and a twin drum winch is located on the chassis between the turntable for the slewing crane and the stiff legs within the space between the stays.

Preferably, the mast is slidable up and down the slideways by raising and lowering the boom of the slewing crane and connecting the boom of the slewing crane to the mast with a lift strop.

In order to lock the supported lift towing boom at the required height, mechanical locking means may be provided. This locking means may comprise a generally vertically extending plate on the rear of each stiff leg spade housing with a row of apertures therein arranged to co-operate with one or more eyes provided on the mast so that when the eyes are aligned with a pair of apertures in the two plates, a locking bar may be passed therethrough.

The supported lift towing boom preferably comprises a folding boom which is foldable between a generally upright transport position and a generally horizontal operating position, the folding boom incorporating an extendable boom for engagement with the disabled vehicle, the folding boom having an abutment face which abuts against an anvil on the base of the mast when in its operating position to support the weight of the disabled vehicle. Preferably, a wedge shaped spacer is insertable, e.g. hydraulically, between the anvil and abutment face to change the attitude of the folding boom when in its operative position from generally horizontal, so that its free end is raised relative to its front end.

Several embodiments of a recovery and towing vehicle in accordance with the present invention are now described by way of example with reference to the accompanying drawings, in which:

FIG. 2 is a fragmentary perspective view from the rear and to one side of the vehicle of FIG. 1, showing how the supported lift towing boom is raised and lowered;

FIG. 3 is a schematic side elevation with parts omitted for the sake of clarity, of part of an alternative embodiment of vehicle, and FIG. 4 is a further schematic side elevation, with parts omitted for the sake of clarity, showing a modification of the previous embodiments.

Figure 1:
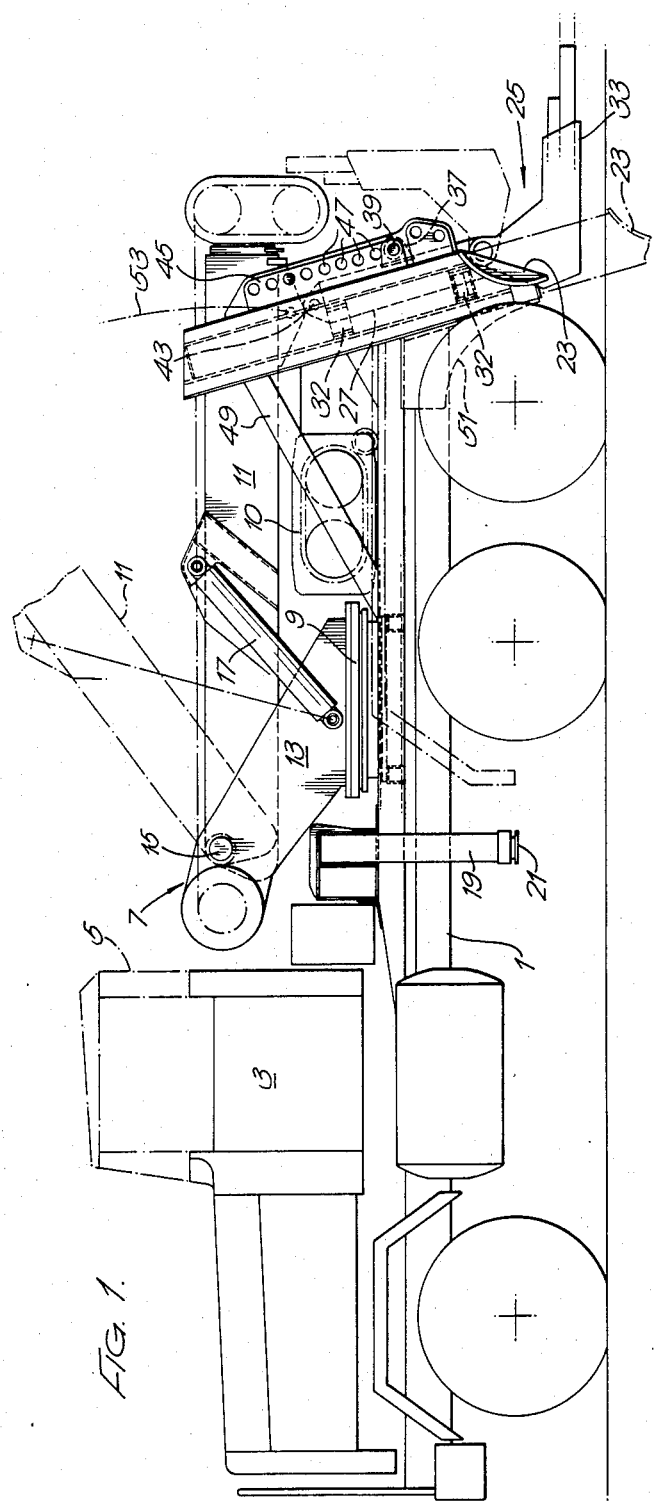
FIG. 1 is a side elevation of a first embodiment of the vehicle.

Referring to the drawings, the recovery and towing vehicle has a main chassis 1 on which a cab 3 is mounted. The top 5 of the cab 3 is removable to reduce the overall height of the vehicle or, alternatively, it may be made of canvas with a demountable frame. A slewing crane 7 is supported on the chassis 1 behind the cab 3 on a turntable 9 in known manner, the crane having an extendable boom 11 of generally known construction. The boom is pivotally mounted at its forward end between a pair of support arms 13 extending upwardly and forwardly from the turntable 9 about a generally horizontal axis 15. To move the boom from its generally horizontal position of rest shown in full lines in FIG. 1 to a raised position such as that shown in broken lines in FIG. 1, a pair of hydraulically operated piston and cylinder devices 17 is provided. To stabilise the vehicle when the slewing crane is used for lifting heavy loads, oppositely extending outriggers 19 are supported on the chassis 1 immediately in front of the turntable 9, the outriggers 19 being of generally known construction with extendable feet 21. At the rear of the vehicle a pair of hydraulically extendable stiff leg spades 23 is also provided, the extended position of the spades 23 being shown in outline only.

Immediately to the rear of the turntable 9 a twin drum winch 10 is provided, the rope from this winch extending through a fairlead at the rear of the vehicle so that the free end of the rope can be connected to a vehicle which, for example, is to be recovered from a ditch. Normally, before winching the vehicle from a ditch, the spades 23 would be extended to their operative position in know manner.

A supported lift towing boom indicated generally at 25 is provided at the rear of the vehicle and a mast 27 of this boom is mounted for generally vertical sliding movement in a pair of slideways 29 supported on the internal side walls of the housings or boxes 31 in which the stiff leg spades 23 are slidable, for example under the control of hydraulic piston and cylinder devices. The mast 27 is provided at its rear both at the top and the bottom with a pair of cross-members 32 having pads 34 on each of their faces which engage within the slideways 29. At its lower end a folding boom 33 is pivotally supported on the mast 27 and an extending boom 35 is supported in known manner within the horizontal limb of the folding boom 33.

Two lugs 37 project from the rear of the mast 27 and have apertures therein so as to form eyes through which a transverse locking bar 39 may be threaded mechanically to lock the mast at a particular height. The mast is moved up and down its slideways 29 by raising and lowering the crane boom 11 and connecting the boom 11 by means of a lift strop 41 to a lifting eye 43 at the top of the mast 27. A plate 45 projects rearwardly from each housing 31 and a row of apertures 47 is provided in each plate 45. It will thus be appreciated that to lock the mast 27 and thus the supported lift towing boom at a particular height, e.g. after the extending boom has picked up a vehicle to be recovered, the lugs 37 are aligned with the desired pair of apertures 47 and the locking bar 39 is slid through the four apertures thereby taking the total weight of the towing boom and its recovered vehicle on the plates 45. This means of course that the boom 11 can be lowered and the strop 41 removed.

In order to stabilise the housings 31, each is connected adjacent its top to the vehicle chassis 1 by means of an inclined forwardly extending stay 49 and towards its bottom end further strengthening plates 51 connected to the chassis 1.

When the mast 27 is lifted by raising the boom 11, the path taken by the lifting point on the boom 11 is shown in FIG. 1 at 53. This path is of course arcuate and will result in variable friction forces being experienced between the pads on the cross-members 32 of the mast and the slideways 29 since the latter are straight and inclined upwardly and rearwardly parallel to the housings 31.

If desired, these friction forces may be reduced by providing arcuate slideways 29a as shown in the embodiment of FIG. 3 in place of the straight slideways 29 in the embodiment of FIGS. 1 and 2 on the inner faces of the housings 31. The mast indicated generally at 27a will therefore be provided with a pair of modified cross members 32a slidable in the arcuate slideways 29a. Obviously, if the slideways 29a are arcuate it will also be necessary to provide matching arcuate plates 45a with apertures 47 therein with which apertures in lugs 37 can be aligned so that a locking bar 39 can be slid through the aligned apertures to take the total weight of the towing boom at its desired height. A further advantage of providing arcuate slideways 29a is that as the towing boom is raised to its uppermost position so the top of its mast 27a will be tipped towards the front of the vehicle so as to form an angle $\alpha$ with the horizontal. This in turn causes the folding boom 33 (not shown in FIG. 3) and especially the free end of the extending boom 35 to be moved from a generally horizontal position to an inclined position thus giving extra lift to the disabled vehicle. When the mast is located at the bottom of the arcuate slideways 29 it forms an angle $\alpha'$ with the horizontal. It will thus be appreciated that the folding boom will be generally horizontal when the mat 27a is at the bottom of the slideways 29a but when the mast 27a is towards the top of the slideways 29a the free end of the extending boom 35 will be higher than its opposite end.

FIG. 4 shows an optional feature which can be provided either with the construction of FIGS. 1 and 2 or with the construction of FIG. 3. In this Figure, a piston and cylinder device 51 for moving the folding boom between its transport position and its illustrated operating position is illustrated. The bottom end of the mast 27 is provided with a forwardly extending tail 53, the rear face of which forms an anvil 55. As shown, a wear plate 57 forms part of the surface of the anvil 55 and in the constructions of FIGS. 1-3, the anvil 55 would normally be abutted by an abutment face 59 on the folding boom 33. However, by inserting a spacer wedge 61 between the anvil 55 and the face 59, the angle of folding boom 33 can be changed. The wedge 61 can be moved to and fro by means of a piston and cylinder device 63, and the further the wedge 61 is inserted, the more the free end of the extending boom connected to the folding boom 33 will be raised. Thus, with the aid of the wedge 61, extra lift capacity for the disabled vehicle can be obtained.

It will thus be appreciated that an extremely compact towing and recovery vehicle is provided with an extremely low profile. With a traditional pivoted supported lift towing boom this would not be possible.

It will of course be understood that the present invention has been described above purely by way of example, and modifications of detail can be made within the scope and spirit of the invention.

What is claimed is:

1. A recovery vehicle comprising a chassis, two parallel arcuate slideways connected to said chassis and a supported lift towing boom having a mast which is slidably supported between and within said two parallel slideways and a boom connected to the mast extending generally normal to the mast so that as the mast is raised up between the arcuate slideways, the free end of the boom will rise at a greater rate than the end connected to the mast.

2. A recovery vehicle according to claim 1 and further including two housings connected to the rear end of said chassis and wherein two extendable stiff leg spades are supported by said housings and means are provided for extending and retracting said stiff legs relative to their housings and wherein said slideways are mounted on inwardly facing walls of said housings.

3. A recovery vehicle according to claim 2 and including two stays extending forwardly from adjacent the top of said housings for said stiff leg spades to said chassis and wherein said winch is a twin drum winch located on said chassis between said turntable for the slewing crane and said stiff legs and between said stays.

4. A recovery vehicle according to claim 1 including a lift strop to connect said mast to said slewing crane, whereby said mast is slidable up and down said slideways by connecting said slewing crane to said mast with said lift strop and raising and lowering said slewing crane.

5. A recovery vehicle according to claim 1 and including a cab, having a removable top.

6. A recovery vehicle according to claim 1 wherein said slideways are straight.

7. A recovery vehicle comprising a chassis, a winch, a turntable, a slewing crane supported on said turntable, two parallel slideways connected to said chassis, a supported lift towing boom having a mast slidably supported between and within said parallel slideways for generally vertical movement, a folding boom pivotally connected to said mast, said folding boom incorporating an extendable boom and including means to move said folding boom between a generally upright transport position and a generally horizontal operative position, an abutment surface being formed on said folding boom and an anvil being provided on the base of said mast, said anvil and abutment surface being in abutting engagement in the normal operative position of said folding boom and including a spacer wedge insertable between said abutment surface and said anvil and means for inserting said spacer wedge to raise the free end of said extendable boom.

8. A recovery vehicle according to claim 7 wherein said slideways are arcuate.

9. A recovery vehicle according to claim 7 and further including two housings connected to the rear end of said chassis and wherein two extendable stiff leg spades are supported by said housing and means are provided for extending and retracting said stiff legs relative to their housings and wherein said slideways are mounted on inwardly facing walls of said housings.

10. A recovery vehicle according to claim 7 and including two stays extending forwardly from adjacent the top of said housings for said stiff leg spades to said chassis and wherein said winch is a twin drum winch located on said chassis between said turntable for the slewing crane and said stiff legs and between said stays.

11. A recovery vehicle according to claim 7 including a lift strop to connect said mast to said slewing crane, whereby said mast is slidable up and down said slideways by connecting said slewing crane to said mast with said lift strop and raising and lowering said slewing crane.

12. A recovery vehicle according to claim 7 and including a cab having a removable top.

* * * * *